Oct. 24, 1950 — L. T. SACHTLEBEN ET AL — 2,527,454
RECORDING AND MONITORING OPTICAL UNIT
Filed May 29, 1947 — 3 Sheets-Sheet 1

LAWRENCE T. SACHTLEBEN,
& JAMES L. PETTUS,
Inventors

Oct. 24, 1950   L. T. SACHTLEBEN ET AL   2,527,454
RECORDING AND MONITORING OPTICAL UNIT
Filed May 29, 1947   3 Sheets-Sheet 2

LAWRENCE T. SACHTLEBEN,
& JAMES L. PETTUS,
Inventors.

By
Attorney

NEGATIVE

DIRECT POSITIVE

LAWRENCE T. SACHTLEBEN,
& JAMES L. PETTUS,
Inventors.

Patented Oct. 24, 1950

2,527,454

UNITED STATES PATENT OFFICE 2,527,454

RECORDING AND MONITORING OPTICAL UNIT

Lawrence T. Sachtleben, Haddonfield, N. J., and James Lawrence Pettus, Sherman Oaks, Calif., assignors to Radio Corporation of America, a corporation of Delaware Application May 29, 1947, Serial No. 751,406

8 Claims. (Cl. 179—100.3)

This invention relates to sound motion picture film apparatus and particularly to an optical monitoring system for a sound film recorder whereby the operation and adjustment of the modulating element, the condition of the light source, and the type of record being recorded are indicated.

Monitoring systems which utilize a beam of light vibrated by a modulating element, such as the mirror of a galvanometer, and projected to an observation medium to indicate the adjustment and operation of the modulating element, as well as the condition of the light source, have been used. Monitoring systems which show the type of record being recorded are also known. For instance, Dimmick co-pending application, Ser. No. 629,295, filed November 17, 1946, now Patent No. 2,468,048, shows a characterized type of monitoring system, while Sachtleben and Pettus co-pending application, Ser. No. 743,620, filed April 24, 1947, now Patent No. 2,504,591 shows a unitary type of recording and monitoring system of the general form of the present invention.

The monitoring system disclosed hereinafter, however, not only combines the features of various prior systems, but also has simplified the construction and positioning of the optical units to provide a particularly compact, efficient and economical structure. Practically all of the advantages of the more expensive and complicated systems are obtained while reducing the number of optical elements and their adjustments. Therefore, there is less likelihood of the system becoming misaligned during operation.

The principal object of the invention, therefore, is to facilitate the recording of a sound record and the monitoring of the modulating element and light source employed in the recording operation.

Another object of the invention is to provide an improved method of and system for obtaining an indication of the operation and adjustment of a sound recording modulating element and the condition of the light source of the recording system.

A further object of the invention is to provide an improved and simplified monitoring optical system for photographic sound recorders.

A still further object of the invention is to provide an improved monitoring system which indicates the operation and adjustment of the modulating elements, the condition of the light source and the type of record being recorded.

A still further object of the invention is to provide a monitoring optical unit in integral association with its recording optical unit.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Figure 8:
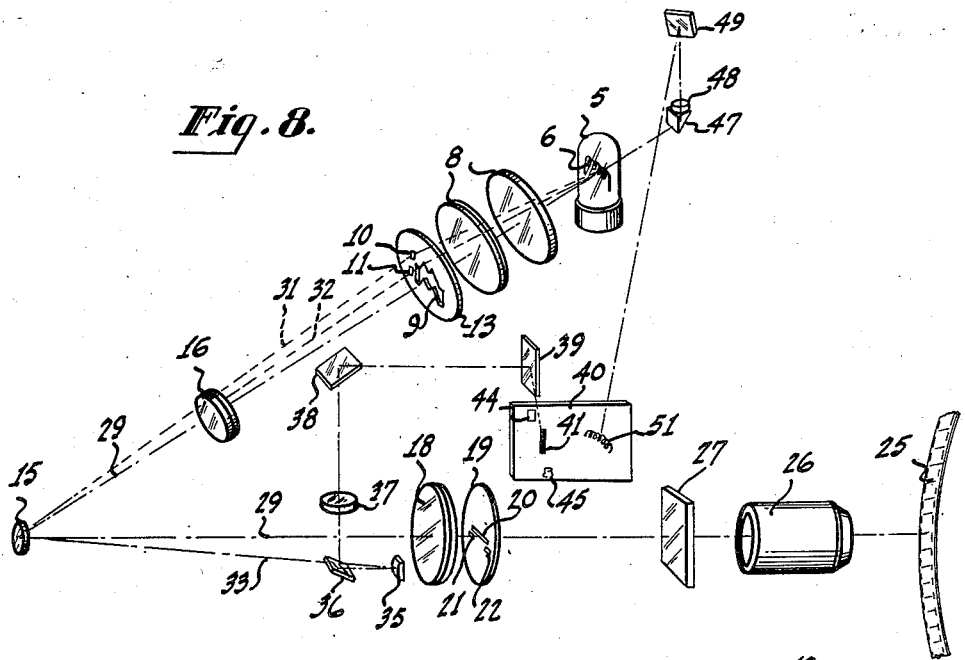
Fig. 8 is a diagrammatic perspective view of the optical elements of the recorder and monitoring system.

Referring now to the drawings in which like numerals identify identical elements and particularly to Fig. 8, a light source 5 having a filament 6 provides light for the recording and monitoring systems, the light gathered by condenser lenses 8 being projected through a recording aperture 9 and monitoring apertures 10 and 11 of an aperture plate 13. The emergent light from these apertures is projected to the mirror 15 of a galvanometer modulator through an intermediate lens 16, the light being reflected by the mirror 15 to a condenser lens 18 and then to a slit plate 19 having slits 20, 21 and 22 therein. Emergent light from the slits is impressed upon a film 25 by an objective lens unit 26, the light passing through a filter 27 if desired. The main recording ray is shown by the broken line 29. The above described optical system is of the type disclosed and claimed in Dimmick co-pending application, Ser. No. 742,545, filed April 19, 1947, now Patent No. 2,468,049.

The monitoring optical portion of the system utilizes the light rays passing through apertures 10 and 11, indicated by the broken lines 31 and 32, the rays 31 and 32 being shown as a single line 33 beyond the mirror 15 for the sake of clarity. The light rays 31 and 32 are received upon a lens mirror 35 which is a plano convex lens silvered on the plane side. Mirror 35 refracts and reflects the light back along a path parallel to the axis of lens 18 to a plane mirror 36 and then vertically to an achromatic lens 37 where an image of the galvanometer mirror 15 is produced by lens mirror 35. This image is stationary and centered in lens 37 regardless of the movement of the monitor aperture images in the vicinity of lens mirror 35.

From lens 37 the monitoring light passes to a plane mirror 38 and then parallel to the axis of lens 18 to a plane mirror 39 which directs the light forward to the back of a translucent screen 40 as indicated by an image 41 and one of the images 44 or 45, as will be explained hereinafter. The vibrations of the galvanometer mirror 15 about its axis in the horizontal plane causes the monitor image 41 to move in a vertical direction and in a plane very near the lens mirror 35. This image is then formed on the monitor screen by lens 37 at a magnification of about five times and where it moves in a vertical direction.

For monitoring the filament 6 of the lamp 5, light coincident with the recording axis 29 is reflected upwardly by a prism 47 through a spherical lens 48 to a mirror 49 which projects the light forward to the screen 40 as shown by an image 51.

To illustrate the action of the monitoring system, reference is made to Figs. 9 to 12, inclusive, wherein front views of the aperture plate 13 and slit plate 19 are shown, as well as the images on the screen 40, when recording different types of records such as a negative and a direct positive. The aperture plate 13 has a W-shaped aperture 9 therein and two monitoring apertures 10 and 11, the latter two being off-set substantially one-half the width of each aperture. When the galvanometer is tilted so that light along the upper side edge of aperture 9 lies along the slit 20, a negative record will be obtained upon normal development of the film, and the light through aperture 10 will appear as a shaded image such as shown at 52 in Fig. 9.

Figure 9:
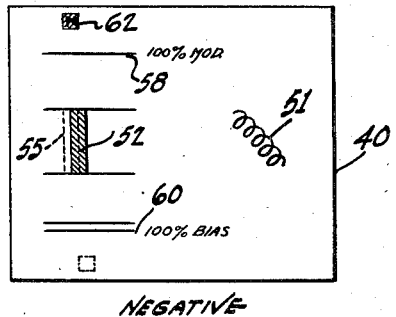
Figs. 9 and 10 are views of the observation screen showing two positions of adjustment of the modulator.
Figure 11:
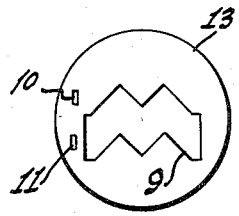
Fig. 11 is a front view of the one form of recording aperture.
Figure 12:
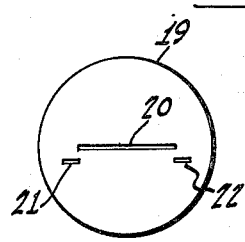
Fig. 12 is a front view of the recordng slit plate.
Figure 10:
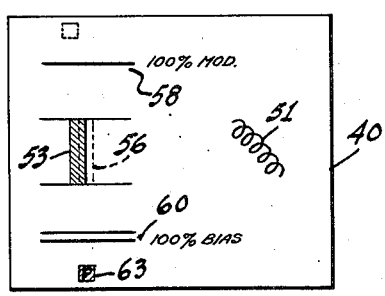

When the galvanometer mirror is adjusted so that the light through the lower side edge of the aperture 9 lies along the slit 20, a direct positive record will be obtained upon normal development of the film, and the light through aperture 11 will form a shaded image such as shown at 53 in Fig. 10. The dotted lines 55 in Fig. 9 show the position of the direct positive monitoring image in Fig. 10, while the dotted lines 56 in Fig. 10 show the position of the negative monitoring image in Fig. 9 for the purpose of comparison. The images 52 and 53 vibrate in a vertical direction in accordance with the amplitude of the signal being recorded, 100% modulation being indicated by the upper lines 58. As the amplitude of the signal increases, the application of noise reduction bias is indicated by the position of the lower edge of the beam, 100% bias being shown by lines 60. The filament image 51 is, of course, shown in each instance.

It will be noted in Fig. 9, that when the system is adjusted for recording a negative record, an upper square 62 is illuminated. This square may be marked with a letter "N" to indicate that a negative record is being recorded. In Fig. 10, a lower square 63 is shown having the letter "P" marked therein to indicate that a direct positive record is being recorded. Respective squares 62 and 63 are illuminated by light passing through the other aperture not being used to produce images 52 and 53. That is, the light passing through aperture 10 produces image 52 when a negative record is being recorded, while light passing through aperture 11 produces the image 62 to illuminate the letter "N." Similarly, when a direct positive record is being recorded, light through aperture 11 produces the image 53, while light through aperture 10 produces the image at 63 to illuminate the letter "P." Thus, not only is the modulating images 52 and 53 shown together with filament image 51, but also an indication is obtained of the type of record being recorded.

To illustrate the dimensions involved in a practical system, such as described above, the distance from the filament 6 to the mirror 15 was 5.135 inches while the distance from the mirror 15 to the film 25 was 9.070 inches for recording on 35 mm. film. The distance from the mirror 15 to the slit plate 19 was 2.6305 inches and the distance from the lens mirror 35 to the slit plate 19 was .298 inch. The distance between lens mirror 35 and mirror 36 was .9375 inch. The vertical distance from mirror 36 to mirror 38 was 2.234 inches while the lens 37 was positioned .166 inch above the lens 36. The mirror 39 was positioned 2.3125 inches from the mirror 38 while the distance between the screen 40 and the mirror 39 was .375 inch. With respect to the elements 47, 48 and 49 for monitoring the filament 6, the distance between the filament and the prism 47 was 1.375 inches while the vertical distance was 2.687 inches and the distance between the mirror 49 and the screen 40 was 4.103 inches. These dimensions provided a compact and unitary optical arrangement, the images on the screen 40 being particularly stable and sharp.

To illustrate the structures and mountings of the various optical elements just described, reference is made to Figs. 1 to 7, inclusive. All optical elements are mounted on a plate 65 having elongated holes 66 therein to permit adjustment of the base with respect to the film 25. A fine lateral adjustment of the optical axis 29 is obtained by a pair of set-screws 67.

The lamp 5 is in a mount 114 attached to the base 65 and has an automatic release lever 69 such as disclosed and claimed in Pettus copending application Ser. 739,007, filed April 2, 1947. A cylindrical casing on barrel 71 contains the aperture plate 13 and lenses 8, the casing being mounted in an opening in a wall section 72 of the base 65. The lenses 8 and slit plate 13 are held in a sleeve holder 74 which may be doweled to the casing 71 by a dowel 75 to fix the position of the plate and lenses in the barrel 71. The barrel 71 has a key 77 in a groove in the casting 72, the key being attached to the upper surface of the barrel by a screw 78 and a dowel 79 to properly orient the aperture 9. The entire unit is then adjusted longitudinally and held in the wall section 72 by a screw 80.

The galvanometer 82 is mounted in a bracket 83 on a horizontal pivot formed by screws 84 and 85. Lateral adjustment of the galvanometer may be obtained by adjustment of screws 86 and 87, while the galvanometer may be tilted on its horizontal axis by a thumb screw 88 bearing against the lower edge of the galvanometer. When the screw 88 is backed off a spring 89 tilts the galvanometer in the opposite direction.

The net unit is a housing 90 having a cylindrical barrel 91 at the front end thereof which houses the condenser lens 18 and the slit plate 19, (see Fig. 3) and the projection optical unit 26 at the other end thereof. Within the housing 90 may also be positioned a shutter and a filter 27 as described in the above identified co-pending application of Sachtleben and Pettus.

Figure 4:
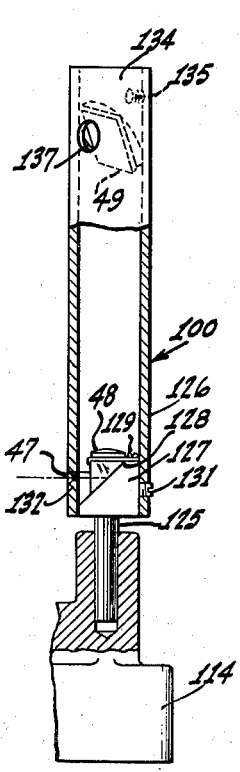
Fig. 4 is a detailed view, partially in cross-section, of the unitary optical element for the light source taken along the line 4—4 of Fig. 2.
Figure 6:
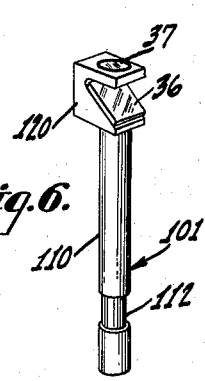
Fig. 6 is a perspective view of one of the optical elements of the monitoring system for the modulator.
Figure 5:
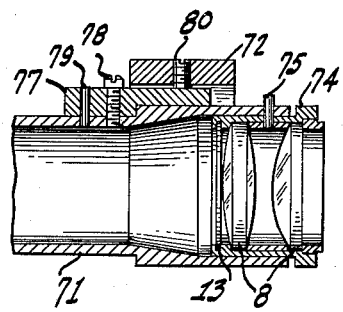
Fig. 5 is a cross-sectional view of the aperture and recording optical unit between the light source and modulator taken along the line 5—5 of Fig. 2.
Figure 7:
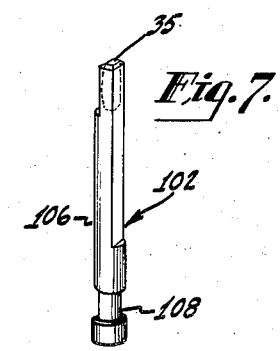
Fig. 7 is a perspective view of another optical element of the monitoring system for the modulator.

The above described unit performs the recording operation utilizing the light as indicated by ray 29 in Fig. 8. The monitoring units include elements 100 shown in Fig. 4, 101 shown in Fig. 6, 102 shown in Fig. 7, and 103 shown in Fig. 3. The elements 101 and 102 are mounted on part of the casting of the housing 90 as shown at 105. The post 106 is set into the casting 105 and held therein by a set-screw 107, the end of which sets in the notch 108 of the post. The upper portion of the post 106 is flattened and the lens mirror 35 is cemented on the flat surface of the post. The long back flat surface is desired to permit the removal of the post 106 past the lens barrel 91. At the other end of the casting 105 is a second post 110 having a notch 112 therein which accommodates the end of a set-screw 113 for holding the post in position. The top of the post 110 supports the mirror 36 on an angular side of the notch in a block 120 therein, while the upper extension of the block supports the lens 37. The posts 106 and 110 are adjusted so that the light beam 33 is reflected by the lens mirror 35 to the mirror 36.

Figure 2:
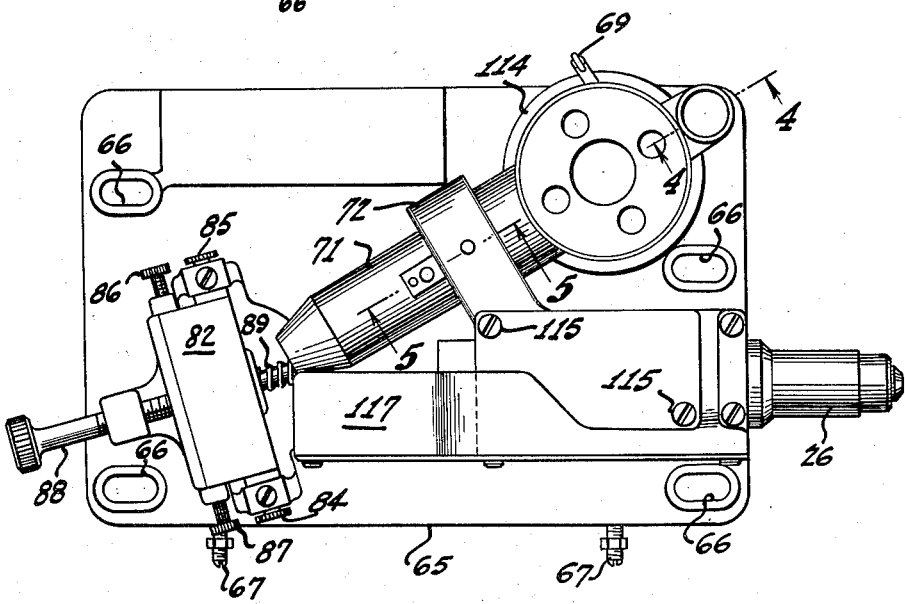
Fig. 2 is a plan view of the unit shown in Fig. 1.
Figure 3:
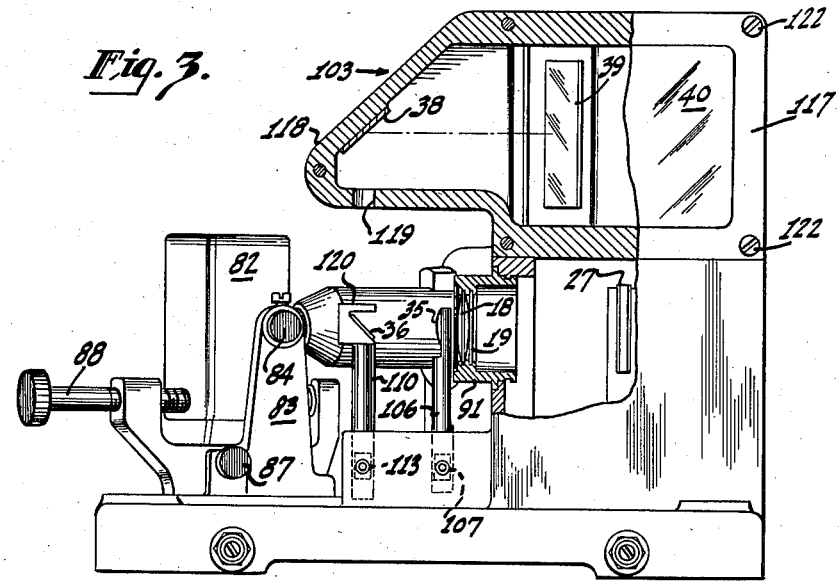
Fig. 3 is a front view of the unit of Fig. 1, partially in cross-section.

Mounted on the upper surface of housing 90 by screws such as shown at 115 in Fig. 2 is a rectangular shaped casting having a triangular closed end 118, the bottom portion of the triangular end 118 having an opening 119 through which the light from the lens 37 passes to the mirror 38 cemented on the angular side of the end 118. On a rear angular vertical side of the casting 117 the mirror 39 is cemented which reflects the light forwardly to the translucent glass plate 40 which is held in position by a cover 121 fastened to the casting by screws such as shown at 122. The light path thus provided by the elements 101, 102 and 103 positions the images shown in Figs. 9 and 10, except for the filament image 51, which is received through the open back portion of the casting 117.

Figure 1:
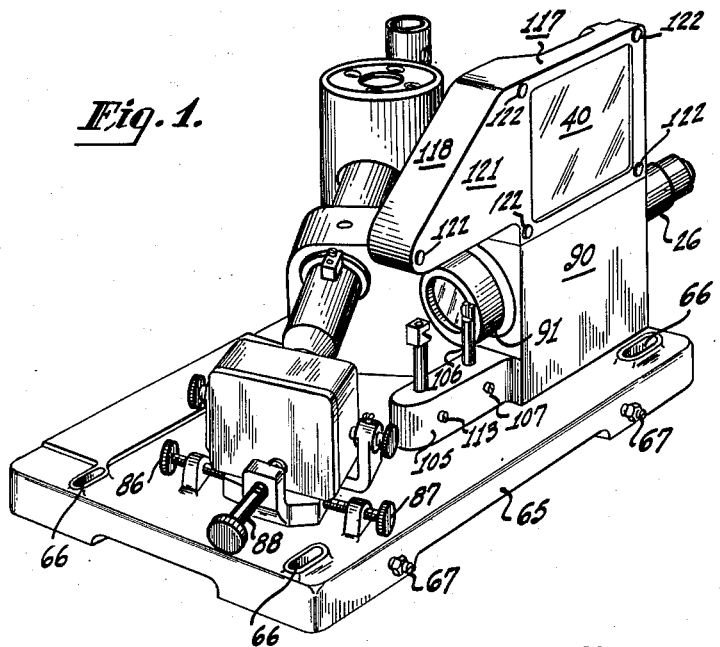
Fig. 1 is a perspective view of the recording optical unit and the monitoring system of the invention.

Referring now to Figs. 1, 2 and 4, there is mounted on the base 114 of the lamp 5 a rod 125 supporting a tube 126, in the base of which is mounted the prism 47 and lens 48 on a block 127. The prism and lens are held by a clip 128 attached to the block 127 by a screw 129, the entire assembly being held in position by a set screw 131. Light from the filament 6 reaches the prism 47 through a hole 132 in the tube 126, the light being reflected upwardly to the mirror 49 attached to a plug 134 held in position by a set-screw 135. The light reaching the mirror 49 is reflected from the tube 126 through an opening 137 therein to the screen 40 to form the image 51 of the filament 6. The images 41, 44, 45 and 51 are thus viewed from the front side of the screen 40 in a plane along the front portion of the optical unit.

It is to be noted that the monitoring optics for the modulator 82 have been simplified to a minimum by utilizing only units 101, 102 and 103, the element 103 also providing the image of the filament in association with the unit 100. The lamp filament optics are all contained in a single unit which may be quickly attached to and detached from the recorder optical unit as shown in Fig. 4. Adjustments may thus be made on a bench away from the recorder. The modulator monitoring optics are also contained in the minimum of units which, when fixed in position, are difficult to get out of alignment, but very easily adjustable if they do. The monitoring images are presented in a manner to permit easy daylight observation thereof, and are presented in a position to be easily observed. The various units are easily accessible for cleaning, removal or repair, while all adjustments, as mentioned above, may be made with the entire unit on a bench before attachment to the recorder.

Although this invention has been illustrated for recording a certain type of record, it is to be understood that it may be used for recording other types of records by changes in the shape of the aperture 9. Furthermore, it is adaptable to the recording of sound tracks on either 35 mm. or 16 mm. film.

We claim:

1. The method of simultaneously indicating the adjustment and operation of a sound recording modulating element adapted to record either a negative record or a direct positive record on a film, comprising forming light into a plurality of light beams, one of said beams being of a chevron-shaped type in which the projection of a certain portion of light from one edge of said beam forms a negative record, and light from another edge of said beam forms a direct positive record, vibrating said beams in accordance with sound waves to be recorded, projecting light from said other beams for observation, utilizing one of said other beams for indicating the amplitude of vibration of said chevron-shaped beam, and utilizing another of said other beams for indicating the certain portion of said chevron-shaped beam being projected to the film.

2. The method in accordance with claim 1, which includes forming another light beam and projecting said other beam for observation to indicate the condition and adjustment of the light source for generating said beams.

3. The method of simultaneously indicating the adjustment and operation of a sound recording modulating element adapted to record either a negative record or a direct positive record on a film, comprising forming light into three beams, one of said beams being of a chevron type, whereby the projection of the varying section of one edge of said beam forms a negative record, and the projection of the varying section of the other edge of said beam forms a direct positive record, vibrating all of said beams in accordance with sound waves to be recorded, projecting the other two beams for observation utilizing one of said other beams for indicating the amplitude of vibration of all of said beams, and utilizing the third beam for indicating the particular varying section of said chevron type beam being projected to the film.

4. The method in accordance with claim 3, which includes utilizing said one other beam for indicating amplitude, when said third beam indicates the particular varying projected section of said first mentioned type beam, and utilizing said third beam for indicating the amplitude when said one other beam indicates the particular projected varying section of said first mentioned type beam.

5. A monitoring system for a recording system, comprising a recording optical path including a light source, a light beam modulator, a slit, and a projector unit, and a monitoring optical path including two vertically fixed posts, one of said posts having a reflector at one end thereof for reflecting light from said modulator, the other of said posts having a reflector and a lens at one end thereof for reflecting and projecting said light for observation, and a vertical tube having a reflector and lens in one end thereof and a reflector in the other end thereof for reflecting and projecting light from said source for observation.

6. A monitoring system in accordance with claim 5, in which a casting having a rectangular section and a triangular section is mounted above said projector unit, said triangular section containing a reflector for light from said second mentioned post, and said rectangular section being open on one side to receive light from said tube.

7. A monitoring system for a photographic sound recording system, comprising a base, a light source, a light beam forming unit, a light beam modulator, and a light beam projector unit adjustably mounted on said base, a pair of rod-like adjustable supports between said light beam modulator and said projector unit, optical elements on the ends of said supports for reflecting and projecting light from said modulator rearwardly and upwardly, a casting mounted on said projector unit, a screen in said casting, and optical elements in said casting for reflecting light from said optical elements on said supports to said screen.

8. A monitoring system in accordance with claim 7, in which a vertical tube is mounted adjacent said light source, optical elements in said tube for receiving light from said source, reflecting said light upwardly, and projecting said light horizontally to said screen through an opening in the rear of said casting.

LAWRENCE T. SACHTLEBEN.
JAMES LAWRENCE PETTUS.

REFERENCES CITED

The following references are of record in the file of this patent:

UNITED STATES PATENTS

| Number | Name | Date |
|---|---|---|
| 1,955,378 | Dimmick | Apr. 17, 1934 |
| 2,166,186 | Stack | July 18, 1939 |
| 2,220,198 | Batsel | Nov. 5, 1940 |
| 2,233,907 | Zimmerman | Mar. 4, 1941 |
| 2,233,914 | Collins | Mar. 4, 1941 |
| 2,238,291 | Runge | Apr. 15, 1941 |
| 2,270,350 | Schomacker | Jan. 20, 1942 |
| 2,468,047 | Dimmick | Apr. 26, 1949 |
| 2,468,049 | Dimmick | Apr. 26, 1949 |
| 2,468,142 | Ulmer | Apr. 26, 1949 |